US012750235B2

(12) United States Patent
Carson

(10) Patent No.: US 12,750,235 B2

(45) **Date of Patent: *Sep. 29, 2026**

(54) ELECTRONIC DEPOSIT BOX FOR DATA PROTECTION AND STORAGE

(71) Applicant: EpositBox, LLC, Boca Raton, FL (US)

(72) Inventor: Jan Michael Carson, Port Saint Lucie, FL (US)

( * ) Notice: Subject to any disclaimer, the term of this patent is extended or adjusted under 35 U.S.C. 154(b) by 383 days.

This patent is subject to a terminal disclaimer.

(21) Appl. No.: 18/062,554

(22) Filed: Dec. 6, 2022

(65) Prior Publication Data

US 2023/0114566 A1 Apr. 13, 2023

Related U.S. Application Data

(63) Continuation-in-part of application No. 17/706,566, filed on Mar. 28, 2022, now abandoned.

(60) Provisional application No. 63/170,400, filed on Apr. 2, 2021.

(51) Int. Cl.

| | |
|---|---|
| ***H04L 9/32*** | (2006.01) |
| ***G06F 16/23*** | (2019.01) |
| ***G06F 16/27*** | (2019.01) |
| ***G06F 21/45*** | (2013.01) |
| ***G07C 9/00*** | (2020.01) |
| ***H04L 9/00*** | (2022.01) |

(52) U.S. Cl.

CPC ........ *H04L 9/3247* (2013.01); *G06F 16/2379* (2019.01); *G06F 16/27* (2019.01); *G06F 21/45* (2013.01); *G07C 9/00912* (2013.01); *H04L 9/3239* (2013.01); *H04L 9/50* (2022.05)

(58) Field of Classification Search

CPC .... G06F 16/273; G06F 16/275; G06F 16/278; G06F 16/2379; G06F 16/27; G06F 21/45; H04L 9/3247; H04L 9/3239; H04L 9/50; H04L 9/3236; G07C 9/00912

See application file for complete search history.

(56) References Cited

U.S. PATENT DOCUMENTS

| | | | |
|---|---|---|---|
| 10,013,573 | B2 | 7/2018 | Dillenberger et al. |
| 10,547,444 | B2 | 1/2020 | Harris et al. |
| 10,581,602 | B2 | 3/2020 | Wang et al. |
| 10,614,244 | B1 | 4/2020 | Duhaime et al. |
| 10,798,066 | B2 | 10/2020 | Chizi et al. |
| 10,860,725 | B2 | 12/2020 | Conway |
| 11,003,783 | B1 | 5/2021 | Ursachi et al. |
| 11,212,264 | B1 | 12/2021 | Griffin et al. |

(Continued)

FOREIGN PATENT DOCUMENTS

WO 2021113488 A1 6/2021

*Primary Examiner* — Marcin R Filipczyk

(74) *Attorney, Agent, or Firm* — Rock IP, PLLC

(57) ABSTRACT

An information handling system (IHS), method and computer program product secure data such as personally identifiable information (PII) with separated dual encryption of each data payload and obscured labeling, providing an electronic deposit box (EpositBox) to thwart a data breach, which are then stored in a blockchain with retrieval facilitated by a sidecar indexing database. The IHS receives a tenant data structure tenant record(s) having tabular label(s) associated with a data payload. The IHS assigns a block ID, appends a signature, and a tenant identifier to the tenant record. The IHS stores the tenant record in the blockchain, and the block ID and signature are stored in the sidecar.

15 Claims, 8 Drawing Sheets

(56) References Cited

U.S. PATENT DOCUMENTS

| | | | | |
|---|---|---|---|---|
| 11,250,507 | B2 | 2/2022 | Xu | |
| 11,728,974 | B2 | 8/2023 | Peddada et al. | |
| 11,843,509 | B2 | 12/2023 | Andrews et al. | |
| 2009/0307659 | A1 | 12/2009 | Hawk et al. | |
| 2015/0143112 | A1 | 5/2015 | Yavuz et al. | |
| 2016/0092698 | A1 | 3/2016 | Mattsson et al. | |
| 2016/0378689 | A1 | 12/2016 | O'hare et al. | |
| 2018/0198601 | A1* | 7/2018 | Laine | H04L 9/3239 |
| 2018/0294952 | A1 | 10/2018 | Yuan et al. | |
| 2020/0026873 | A1 | 1/2020 | Jain et al. | |
| 2020/0076578 | A1 | 3/2020 | Ithal et al. | |
| 2020/0084027 | A1* | 3/2020 | Duchon | G06F 21/602 |
| 2020/0342119 | A1 | 10/2020 | Yared et al. | |
| 2020/0387621 | A1 | 12/2020 | Chen | |
| 2021/0014056 | A1 | 1/2021 | Agarwal et al. | |
| 2021/0173945 | A1 | 6/2021 | Karr et al. | |
| 2021/0182423 | A1 | 6/2021 | Padmanabhan | |
| 2021/0243030 | A1* | 8/2021 | Robison | H04L 9/0877 |
| 2022/0159535 | A1 | 5/2022 | Rahman | |
| 2022/0247554 | A1 | 8/2022 | Peddada et al. | |
| 2023/0216947 | A1* | 7/2023 | Bernardi | H04L 67/10<br>713/150 |
| 2024/0202368 | A1 | 6/2024 | Hatcher et al. | |
| 2024/0202725 | A1* | 6/2024 | Anapliotis | G06Q 30/0607 |
| 2024/0333500 | A1 | 10/2024 | Desmarais et al. | |
| 2025/0023743 | A1 | 1/2025 | Carson | |
| 2026/0005880 | A1 | 1/2026 | Sheehan | |
| 2026/0134409 | A1 | 5/2026 | Vukich et al. | |

* cited by examiner

ELECTRONIC DEPOSIT BOX FOR DATA PROTECTION AND STORAGE

CROSS-REFERENCED APPLICATIONS

This application is a continuation in part of U.S. patent application Ser. No. 17,706,566 filed Mar. 28, 2022, which claims the benefit of priority based on U.S. Prov. Pat. Appl. No. 63/170,400 filed Apr. 2, 2021. The entire contents of the above-referenced applications are expressly incorporated herein by reference.

TECHNICAL FIELD

The present disclosure relates generally to personal data protection and storage, and more particularly, to personal data protection and storage as a service using a blockchain as the secure storage object in conjunction with a sidecar indexing database to facilitate data retrieval.

BACKGROUND

Businesses frequently receive financial information from customers for making transactions to purchase or deliver a product or service. As an example, financial information can include credit, debit, or banking information, as well as other personally identifiable information (PII). A business can record the financial information along with other details about a transaction as part of required bookkeeping and business accounting. Customers can, for example, allow a business to have continued access to this financial information for preapproved future transactions.

Computerized sales technology have facilitated the commercial practice of retaining many details of a transaction. With increasing reliance on networked and online communications, consumer financial data has become a target for thieves who exploit security vulnerabilities. Businesses that fail to prevent the theft of customers' financial information can become liable for the resulting financial damage to customers.

This environment has fostered a merchant services business model that reduces businesses' vulnerability to, and liability for, financial data theft. In this merchant services business model, a third-party merchant separately handles the financial transaction with the customer on behalf of the business providing the goods or services. This merchant acts as a middleman, receiving customer data for banking accounts, credit accounts, as well as other financial information to perform the transaction. The business providing the goods or service has no need to store the financial information, and thus risks no liability for any theft of such information. The merchant service business model for financial information has been almost universally adopted by companies because: (i) liability for credit card fraud is completely removed from the company providing goods or services; (ii) the merchant transaction was seamless and did not hinder the sales process; and (iii) the consumer making the purchase was assured, knowing a third-party merchant acted on their behalf to ensure the security and safety of their financial information.

Although the merchant service business model has allowed businesses to outsource transactions involving customers' financial data, businesses also frequently store significant amounts of personal data, also known as Personally Identifiable Information (PII). PII can be collected not only from customers but also from employees, vendors, consultants, and many other sources that are outside the scope of the merchant service business model. Companies store PII for many reasons including but not limited to: efficiency of future transactions; grouping customer types related to product types to understand product use, fit and, success within identified PII groups; forecasting product adoption in PII groups; and developing new products to fit PII groups. Personally identifiable information can include, for example: passwords, usernames, names, email addresses, physical addresses, phone numbers, ages, birthdates, gender, family information, order history, preferences, communication history, emergency contacts, employment information, education, employment history, geographic and demographic information, religious information, membership information, credit card information, and photographs, among other data.

Like financial information, PII has become an increasingly valuable target for theft and data hostage threats. Companies are caught in continuous cycles of patching defensive security measures that fail over time in the face of advancing computing power wielded by well-funded criminal organizations and even state actors. Numerous governmental entities are intervening to establish protection, regulation, and compliance measures for the handling of PII. In turn, companies are burdened with compliance requirements for the collection, storage, and sharing of PI by multiple governing authorities, each with its own interpretation of "compliance." Commercial exposure to liability and compliance complexity will continue to increase. Furthermore, consumers are concerned about the safety and dispersion of their PII across many companies.

Furthermore, while data such as PII can be stored securely in locations such as a blockchain, retrieval of such information can be cumbersome.

The present disclosure is aimed at resolving these and other problems present in the prior art.

SUMMARY

In one aspect of the present disclosure, an EpositBox information handling system (IHS) includes a network interface, secure memory, and a controller. The network interface is communicatively connectable, via a network, to one or more tenant IHSes including a first tenant IHS. The tenant IHSes can use hashing algorithms that hash tabular labels and encryption algorithms that encrypt data payloads, though both or either tabular labels and data payloads can be hashed, encrypted, obfuscated in other ways, or not obfuscated at all. The secure memory of the EpositBox IHS can store an electronic deposit box (EpositBox) platform/application, an EpositBox API, an encryption application, an encryption key data structure, and a sidecar indexing database, though the sidecar indexing database can be located separately from the IHS.

The controller is communicatively coupled to the network interface and to the secure memory. The controller is coupled to at least one hardware processor that executes the EpositBox application to configure the IHS. The controller coordinates with the other components of the EpositBox IHS to securely connect and transfer data to and from other IHSes. The EpositBox IHS securely connects, via the network interface, with tenant IHSes. The EpositBox IHS receives, from the first tenant IHS, a first tenant data structure comprising at least one tenant record. In this example, each tenant record has one or more tenant-hashed tabular labels associated with a tenant-encrypted data payload, though the tabular labels and data payload can be obfuscated in other ways or not obfuscated at all. The tenant data structure or tenant record can contain information identifying the tenant from which the data originates, but the EpositBox IHS can also append a first tenant identifier associated with the first tenant to the at least one tenant record of the first tenant data structure. In this embodiment, for each tenant record, the EpositBox IHS via, for example, the EpositBox API, selects an EpositBox encryption key of one or more EpositBox encryption keys. The EpositBox API, in this example, over-encrypts the respective tenant-encrypted data payload using the selected EpositBox encryption key to produce corresponding one or more secure data records, though the data payload can be obfuscated in other ways or not at all. The EpositBox API stores the one or more secure data records in a multiple-tenant data store within a blockchain distributed data storage network, while a sidecar indexing database, or sidecar, facilitates access to the data records stored within the blockchain. Alternatively, encryption keys may reside on the blockchain and over-encryption may be performed by the blockchain rather than the EpositBox API. As a further alternative, both the blockchain and the EpositBox API may perform encryption/over-encryption.

In another aspect of the present disclosure, a method includes securely connecting, via a network interface of an EpositBox IHS, with a first tenant IHS. The method includes receiving, from the first tenant IHS, a first tenant data structure comprising at least one tenant record. Each tenant record has one or more tenant-hashed tabular labels associated with a tenant-encrypted data payload. The method can include appending a first tenant identifier associated with the first tenant to the at least one tenant record of the first tenant data structure. For each tenant record, the method includes selecting an EpositBox encryption key of one or more EpositBox encryption keys. The method includes over-encrypting the respective tenant-encrypted data payload using the selected EpositBox encryption key to produce corresponding one or more secure data records. Alternatively, for each tenant record, the method can include selecting a blockchain encryption key of one or more blockchain encryption keys. The method can include over-encrypting the respective tenant-encrypted data payload using the selected blockchain encryption key to produce corresponding one or more secure data records. The method can further include encryption with both a blockchain encryption key and a EpositBox encryption key. The method includes storing the one or more secure data records in a secure multiple-tenant data store within a blockchain distributed data storage network, with queries to the blockchain facilitated by a sidecar.

In an additional aspect of the present disclosure, a computer program product includes program code on a computer readable storage device. The program code, when executed by a processor associated with an IHS, enables the IHS to provide functionality of securely connecting, via a network interface of an EpositBox IHS, with a first tenant IHS. The functionality includes receiving, from the first tenant IHS, a first tenant data structure comprising at least one tenant record, each tenant record having one or more tabular labels, which could have been hashed or otherwise obfuscated by the tenant, associated with a data payload, which could have been encrypted or otherwise obfuscated by the tenant. The method can include appending a first tenant identifier associated with the first tenant to the at least one tenant record of the first tenant data structure. The functionality includes, for each tenant record, selecting an EpositBox encryption key of one or more EpositBox encryption keys. The functionality includes over-encrypting the respective tenant-encrypted data payload using the selected EpositBox encryption key to produce corresponding one or more secure data records. Alternatively, the functionality can include, for each tenant record, selecting a blockchain encryption key of one or more blockchain encryption keys. The functionality can include over-encrypting the respective tenant-encrypted data payload using the selected blockchain encryption key to produce corresponding one or more secure data records. Furthermore, encryption may be performed by both an EpositBox encryption key and a blockchain encryption key. The functionality includes storing the one or more secure data records in a secure multiple-tenant data store within a blockhain distributed data storage network with a sidecar facilitating access to the blockchain.

These and other features are explained more fully in the embodiments illustrated below. It should be understood that in general the features of one embodiment can also be used in combination with features of another embodiment and that the embodiments are not intended to limit the scope of the invention.

BRIEF DESCRIPTION OF THE DRAWINGS

The various exemplary embodiments of the present invention, which will become more apparent as the description proceeds, are described in the following detailed description in conjunction with the accompanying drawings, in which.

DETAILED DESCRIPTION

According to aspects of the present disclosure, an electronic deposit box (EpositBox) platform is provided to securely store personal data and avoid, or mitigate, liability for data theft. The EpositBox platform stores and protects PII by acting as a third party to a merchant company providing goods and services, thereby separating merchant companies from PII via a secure performant Application Programming Interface (API) protocol. Similar to the merchant service business model, this act of separation provides the following: (i) liability and compliance overhead for PII storage is removed from the merchant company; (ii) security of PII storage is improved, protecting a company from outsider and insider threats of intent or error, with most data breaches known to be caused by insider error; (iii) PII interaction is seamless, performant, and will not hinder the transaction process; and (iv) consumers will have more confidence in a third-party curator whose business model is to comply with regulators to protect the consumer's PII.

The EpositBox platform makes data more secure by obscuration and anonymization. Most databases are protected by only one encryption key. Moreover, most databases are organized in related tables, columns, and fields with labels and names indicating the location of valuable data. If stolen, criminals can readily locate valuable data and decrypt the data by breaking a single encryption key. By contrast, data sent to EpositBox by a merchant company provides no indication where the valuable information is located, and the encryption of the EpositBox platform is more complex than a single encryption key.

The cost of this service can mimic similar data storage costs per/Gb at cost efficient prices, thereby making the benefits of added security and liability mitigation a welcome added benefit of storing data with EpositBox. EpositBox stores encrypted PII, such as a phone number or an entire profile, but does not receive or store this data in a way that would identify the related natural person. The merchant company, as the holder of the PII, is the only entity that can, from within its own system, relate a person to their personal data. This serves to insulate the merchant company from PII storage liability, and mitigate any potential exposure. The need for this service will continue to increase as regulations expand and change across jurisdictions.

Further, the EpositBox system can store PII in blockchains, thereby making the data immutable by distributing the data over many servers and using the blockchain ledger to make any unauthorized alternations difficult if not impossible. However, querying a blockchain for stored data can prove slow and cumbersome, a process which can be facilitated by using an intermediate sidecar indexing database.

Figure 1:
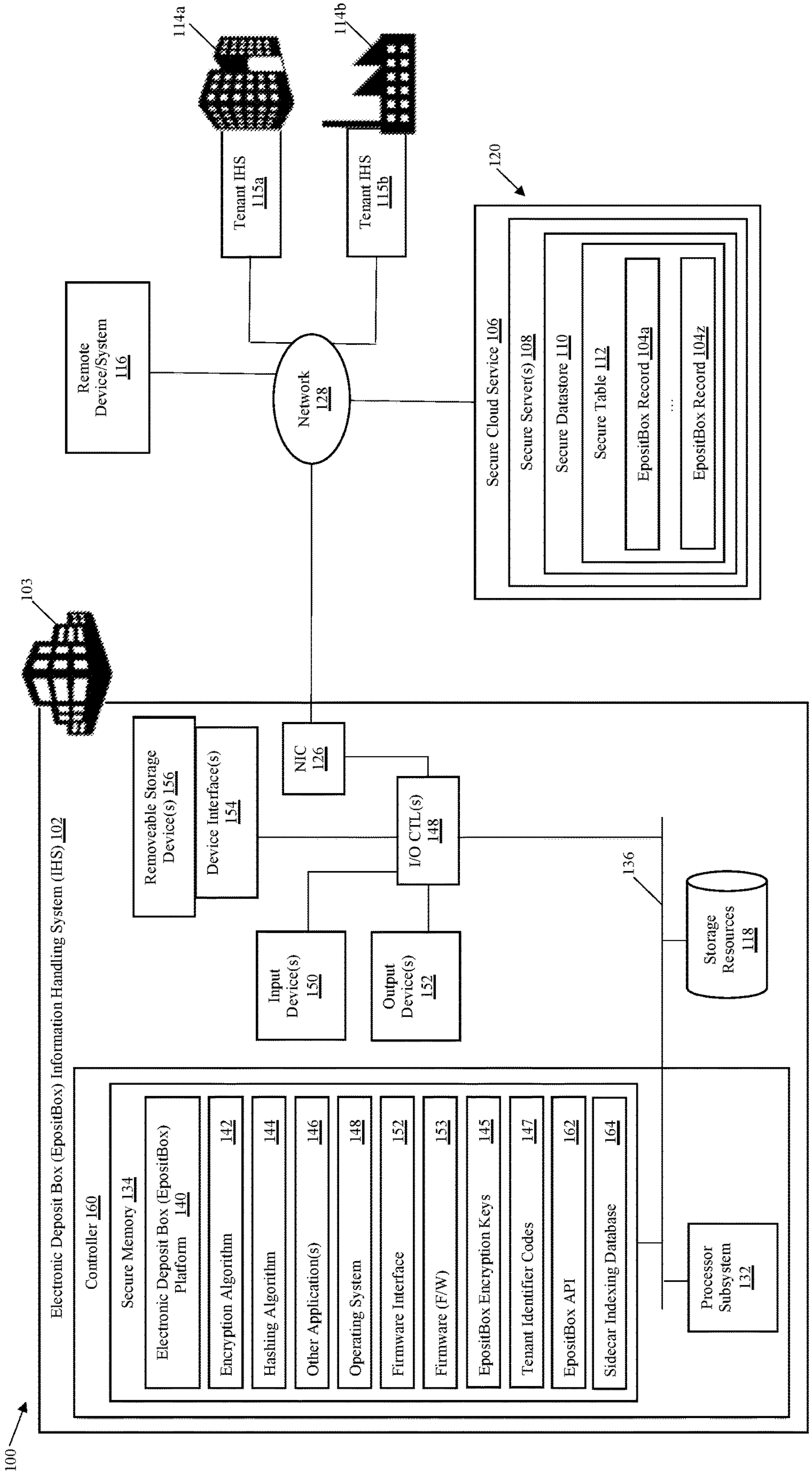
FIG. 1 depicts a simplified functional block diagram of electronic deposit box (EpositBox) environment facilitated and managed by an EpositBox information handling system (IHS).

Turning to the figures, FIG. 1 depicts a simplified functional block diagram of an electronic deposit box (EpositBox) environment 100 facilitated and managed by an EpositBox depositary information handling system (IHS) 102 for an EpositBox business 103. EpositBox IHS 102 secures EpositBox records 104*a*-104*z* that reside in secure cloud service 106 of blockchain system 120, within secure server(s) 108, in secure data store 110, in secure table 112. Secure server(s) 108 can include a plurality of servers distributed in multiple locations. EpositBox environment 100 includes tenants, which for clarity are depicted as two entities: first and second tenants 114*a*-114*b* each respectively using first and second tenant IHSes 115*a*-115*b*. In one or more embodiments, there may be only one tenant. In one or more embodiments, there can be more than two tenants. In one or more embodiments, a tenant for secure data services can be one business entity of a particular enterprise and EpositBox IHS 102 can be another business entity of the same particular enterprise. For clarity, one EpositBox IHS 102 is depicted. However, EpositBox 102 can be implemented in one or more data centers to dynamically shift workloads and perform data recovery/backup functions. Functionality of EpositBox environment 100 can be largely automated with occasional updates and changes implemented via management consoles or other remote device systems 116. EpositBox environment 100 can include resources such as data storage resources 118 integral to EpositBox IHS 102. EpositBox environment 100 can include third-party resources such as the aforementioned cloud storage system 106 that support EpositBox IHS 102. In one or more embodiments, blockchain system 120 can be a private blockchain system or, alternatively, a public blockchain system Within the general context of IHSes, IHS 102 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, IHS 102 can be a server, blade server, rack-mounted server, rack-mounted data storage, or other rack-mounted IT equipment. IHS 102 can include random access memory (RAM), one or more processing resources such as a central processing unit (CPU) or hardware or software control logic, read only memory (ROM), and/or other types of nonvolatile memory. Additional components of the IHS 102 can include one or more disk drives, one or more network ports for communicating with external devices as well as various input and output (I/O) devices, such as a keyboard, a mouse, and a video display. The IHS 102 can also include one or more buses operable to transmit communications between the various hardware components. In one or more embodiments, IHS 102 can include rack-mounted servers to provide computing, communication and storage functionality.

IHS 102 includes a network interface, depicted as network interface controller (NIC) 126. NIC 126 is communicatively connected to network 128. Remote device systems 116 are also communicatively connected to network 128. NIC 126 enables IHS 102 and/or components within IHS 102 to communicate and/or interface with other devices, services, and components that are located external to IHS 102. IHS 102 receives IHS updates and work requests from remote device systems 116 via network 128. These devices, services, and components can interface with IHS 102 via an external network, such as network 128, using one or more communication protocols that can include transport control protocol (TCP/IP) and network block device (NBD) protocol. Network 128 can be a local area network, wide area network, personal area network, and the like, and the connection to and/or between network 128 and IHS 102 can be wired, wireless, or a combination thereof. For purposes of discussion, network 128 is indicated as a single collective component for simplicity. However, it should be appreciated that network 128 can comprise one or more direct connections to other devices as well as a more complex set of interconnections as can exist within a local area network or a wide area network, such as the Internet.

A processor subsystem 132 is coupled to secure memory 134 via system interconnect 136. Secure memory 134 is not accessible via network 128. System interconnect 136 can be interchangeably referred to as a system bus, in one or more embodiments. System interconnect 136 can represent a variety of suitable types of bus structures, e.g., a memory bus, a peripheral bus, or a local bus using various bus architectures in selected embodiments. For example, such architectures can include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus. For the purpose of this disclosure, system interconnect 136 can also be a Double Data Rate (DDR) memory interface. The secure memory 134 can either be contained on separate, removable dual inline memory module (RDIMM) devices or secure memory 134 can be contained within persistent memory devices (NVDIMMs). For example, the NVDIMM-N variety of NVDIMMs contain both random access memory, which can serve as secure memory 134, and non-volatile memory. It should be noted that other channels of communication can be contained within system interconnect 136, including but not limited to inter-integrated circuit (i2c) or system management bus (SMBus). System interconnect 136 communicatively couples various system components. Examples of system components include replaceable local storage resources 118 such as solid-state drives (SDDs) and hard disk drives (HDDs). Software and/or firmware modules and one or more sets of data that can be stored on local storage resources 118 and be utilized during operations of IHS 102. Specifically, in one embodiment, secure memory 134 can include therein a plurality of such modules, including, but not limited to, EpositBox platform or application 140, EpositBox encryption application 142, hashing application 144, and other application(s) 146. Secure memory 134 can also store operating system (OS) 148, a firmware interface 152 such as basic input/output system (BIOS) or Uniform Extensible Firmware Interface (UEFI), platform firmware (FW) 153, EpositBox API 162, and sidecar indexing database 164, also known as a "sidecar database" or simply a "sidecar." While, as shown here, sidecar 164 is integrated into EpositBox IHS 102, for security purposes sidecar 164 can be sandboxed or otherwise isolated from the remainder of IHS 102 or, in the alternative, sidecar 164 can be stored and executed on a separate IHS altogether, connected to EpositBox environment 100 via network 128 or via other interconnection or interconnections.

These software and/or firmware modules have varying functionalities when their corresponding program code is executed by processor subsystem 132 or secondary processing devices within IHS 102. For example, other application (s) 146 can include Internet website hosting, word processing applications, presentation applications, among other applications. Secure memory 134 can also include computer data structures and data values such as EpositBox encryption keys 145 and tenant identifiers (ID) codes 147 which can be used by applications 140, 142, 144, 146, 162, 164.

IHS 102 further includes one or more input/output (I/O) controllers 149 that support connection by and processing of signals from one or more connected input device/s 150, such as a keyboard, mouse, touch screen, or microphone. I/O controllers 149 also support connection to and forwarding of output signals to one or more connected output devices 151, such as a monitor or display device or audio speaker(s). Additionally, in one or more embodiments, one or more device interfaces 154, such as an optical reader, a universal serial bus (USB), a card reader, Personal Computer Memory Card International Association (PCMCIA) slot, and/or a high-definition multimedia interface (HDMI), can be associated with IHS 102. Device interface(s) 154 can be utilized to enable data to be read from or stored to corresponding removable storage device/s (RSD) 156, such as a compact disk (CD), digital video disk (DVD), flash drive, or flash memory card. In one or more embodiments, device interface (s) 154 can further include general purpose I/O interfaces such as inter-integrated circuit ($I^2C$), system management bus (SMB), and peripheral component interconnect (PCI) buses.

In one or more embodiments, EpositBox IHS 102 is managed by controller 160 that configures EpositBox 102 to perform functionality described herein. In one embodiment, controller 160 comprises processor subsystem 132 and secure memory 134. In one or more embodiments, controller 160 has a distributed architecture using a number of collaboratively functioning computing, storage, and communication components. In one or more embodiments, EpositBox IHS 102 is provisioned by a computer program product such as RSD 156 having a computer readable storage device such as physical memory that stores program code that, when executed by a hardware processor such as processor subsystem 132, configures EpositBox IHS 102. The program code can include one or more modules described as being stored in secure memory 134. In an example, secure memory 134 stores EpositBox application 140, encryption application 142, and an encryption key data structure that contains EpositBox encryption keys 145. A network interface such as NIC 126 is communicatively connectable, via network 128, to one or more tenant IHSes 115*a*-115*b* that use a respective hashing algorithm that can hash tabular labels and respective encryption algorithms that can encrypt data payloads. Controller 160 is communicatively coupled to NIC 126 and secure memory 134.

FIGS. 2A-E depict a communication diagram of EpositBox environment 100 exchanging data structures between tenant IHSes 251*a*-251*b* and by EpositBox IHS 264.

In one or more embodiments, EpositBox IHS 264 uses blockchain system 260 to create blockchain ledger 242 that is an immutable and auditable chain of record activity that prevents malicious interference with secured data. In one or more alternative embodiments, EpositBox IHS 264 can be configured to use a semi-private or public blockchain system 260 to create permanent blockchain EpositBox ledger 242. The blockchain ledger includes all activity related to the record. By design, a record is 'read/write-only' and cannot be overwritten or deleted by EpositBox or a customer. New data storage 244 is used to add data to permanent blockchain EpositBox Ledger 242. As will be discussed further below, to revise a previously secured record, a new record version is stored in new data storage 244 with reference to the previous record version included, indicating the change without deleting anything in permanent blockchain ledger 242. No code is present in blockchain system 260 capable of overwriting or deleting a record. In addition, all data can be obfuscated by a tenant using hashing or encryption before the data arrives at EpositBox making the data useless to all except the tenant as the tenant is the only entity that can reconstruct the record to its original form. Upon storage, a tenant's data can be further obfuscated by the EpositBox platform by encrypting the data a second time or overencryption, which can be performed by EpositBox IHS 264 and/or blockchain system 260, rendering the data useless-even to the tenant-until it is properly retrieved via the EpositBox platform. Further, an employee or agent 245 having access to EpositBox IHS 264 via management console 246 does not have authority to over-encrypt secured data as part of a ransom-ware attack since permanent blockchain EpositBox ledger 242 is immutable.

EpositBox IHS 264 includes a number of subsystems, including controller 207 and its component, EpositBox API 216, which allow EpositBox IHS 264 and other IHSes to securely connect and transfer data.

Blockchain system 260 can also use smart contract 243 as a gatekeeper to control access to blockchain system 260, for example, by allowing only authorized entities, or entities from authorized networks, to connect with blockchain system 260.

As will be discussed further below, while the use of blockchain system 260 brings numerous benefits, queries to blockchain system 260 can be time consuming due to the distributed nature of blockchain technology. Sidecar database 262 reduces or eliminates delays associated with blockchain queries by storing the most up-to-date locations of records kept on blockchain system 260, thereby streamlining the querying process. Further, as discussed below, sidecar database 262 is hardened against corruption and compromise by information immutably stored in blockchain system 260.

Figure 2A:
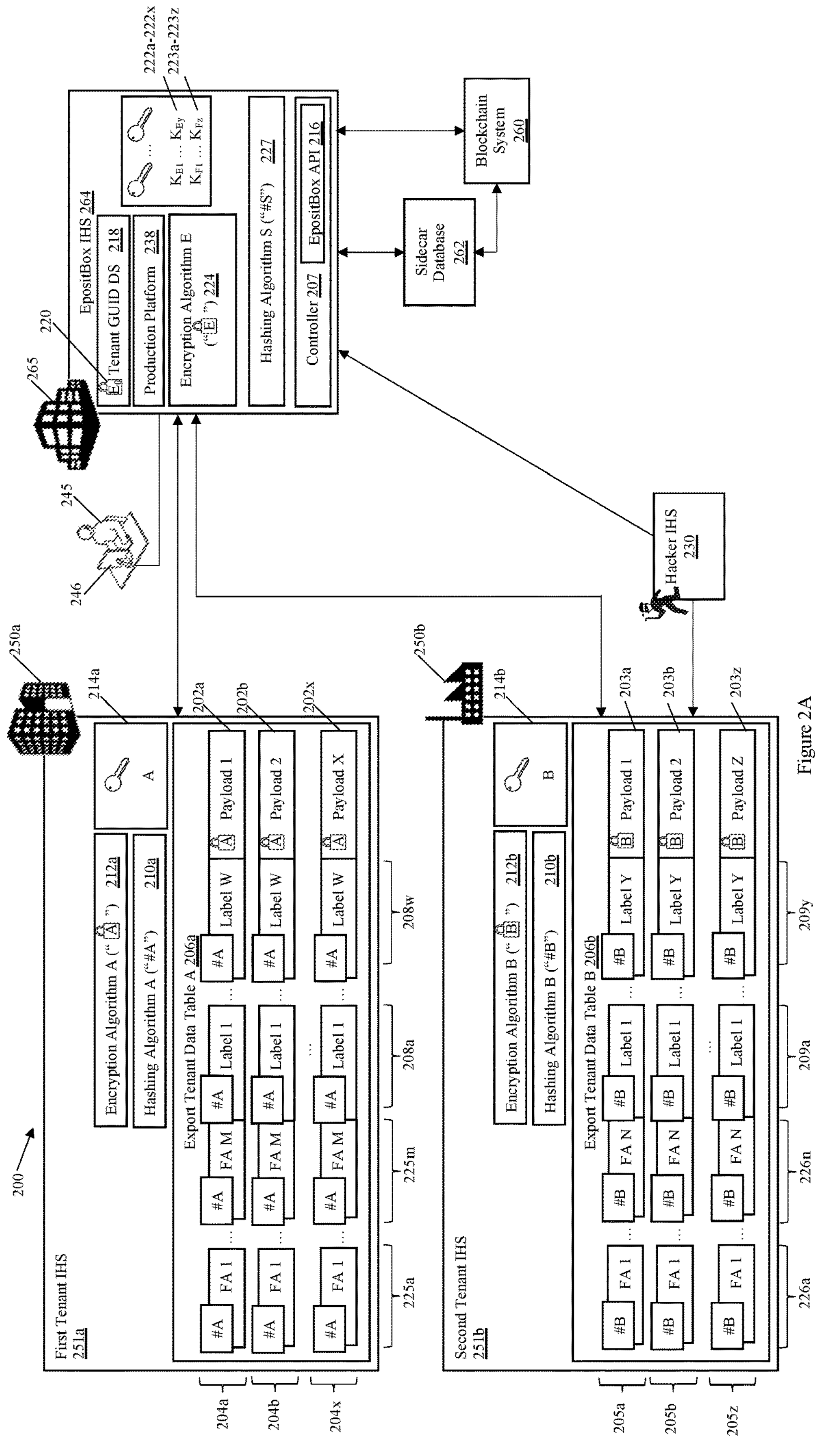
FIG. 2A-E depict a communication diagram of an EpositBox environment with tenant IHSes generating respective data structures secured by EpositBox IHS.
Figure 2B:
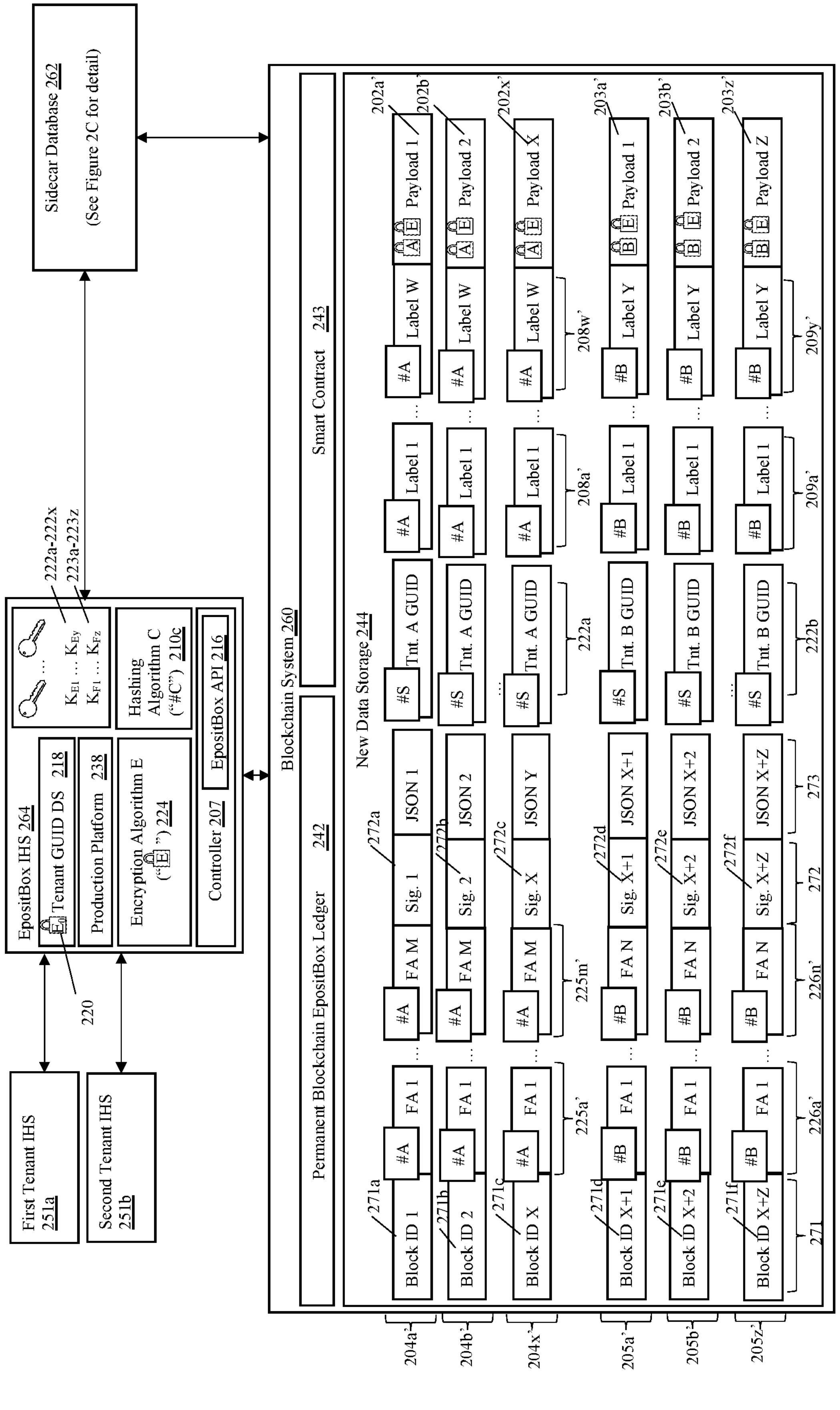
Figure 2C:
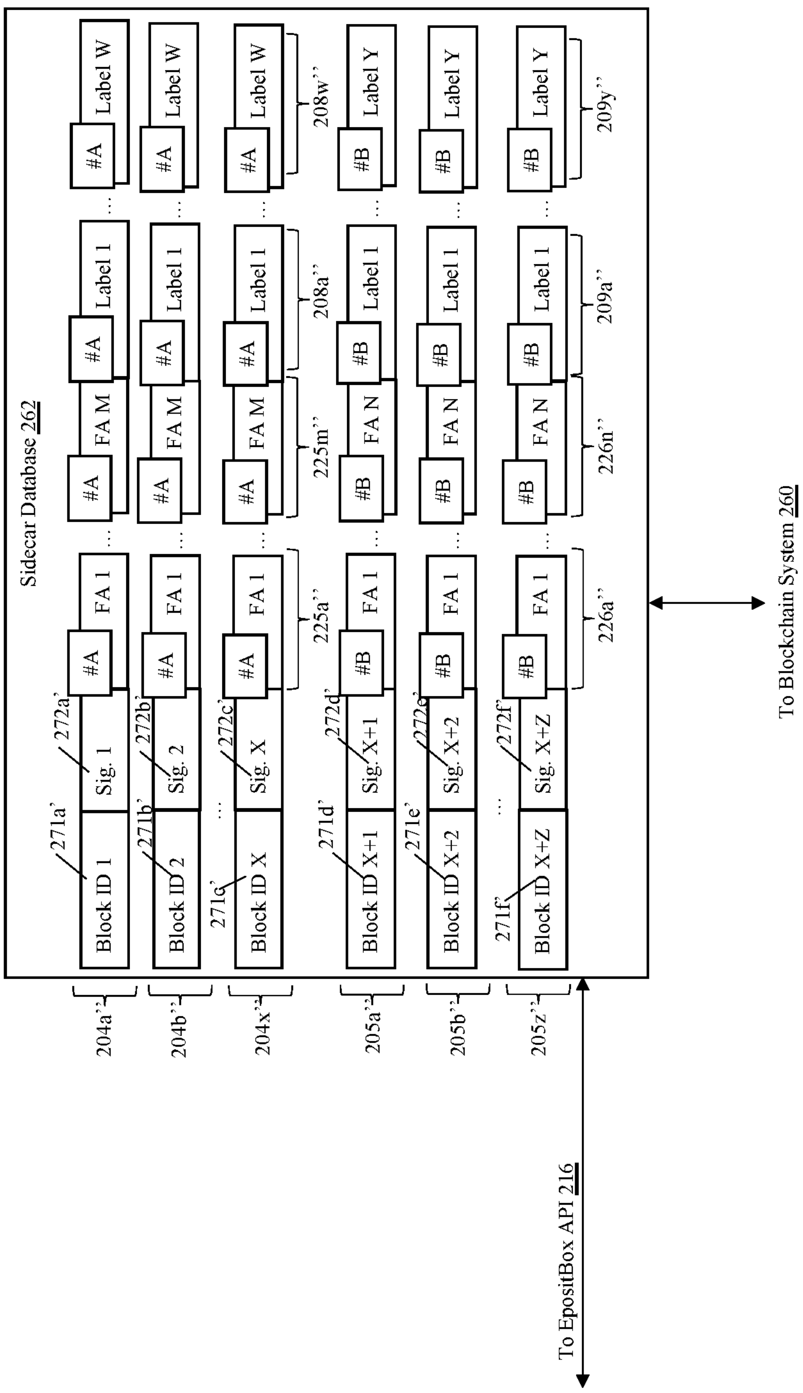

As seen in the environment 200 of FIG. 2A-C, first tenant 250*a* has data that includes personally identifiable information (PII) in payloads 1-X 202*a*-202*x* to secure. First tenant IHS 251*a* prepares records 204*a*-204*x* in export tenant data table "A" 206*a* to convey payloads 1-X 202*a*-202*x*, with each payload associated with additional information including, for example, tabular labels 1-W 208*a*-208*w*, as well as fixed attributes discussed further below.

Tabular labels contain metadata associated with the payloads. For example, a tabular label can be "Phone Number" associated with a portion of the payload, "(555) 555-1234." First tenant IHS 251*a* can hash tabular labels 1-W 208*a*-208*w* using hashing algorithm "A" 210*a*, though another hashing algorithm, an encryption algorithm, another obfuscation method, or no obfuscation technique, can be used instead. First tenant IHS 251*a* can encrypt payloads 1-X 202*a*-202*x* using encryption algorithm "A" 212*a* and encryption key "A" 214*a*, though another encryption algorithm or key, a hashing algorithm, another obfuscation method, or no obfuscation technique, can be used instead.

Each of records 204*a*-204*x* can also contain fixed attributes 225*a*-225*m* ("FA 1" through "FA M"). Each fixed attribute contains information which can facilitate the searching of records 204*a*-204*x* such as account numbers associated with individual customers, organizational identifiers associated with specific tenants, first names, last names, last four digits of social security numbers, or other information. Each fixed attribute 225*a*-225*m* is hashed with hashing algorithm "A" 210*a* in the embodiment of FIG. 2A, though another hashing algorithm can be used, or the fixed attributes can be obfuscated in another way, or not obfuscated at all. Each column of fixed attributes, for example, each FA 1 225*a* in export tenant data table "A" 206*a*, will include the same type of data, for example, a hashed account number. Similarly, each FA M 225*m* will include the same type of data, for example, a hashed last name. The number of "M" fixed attributes in export tenant data table "A" 206*a* can vary depending on tenant needs, system performance requirements, and other variables, but about five can be preferred, though can be many more. The data size of all fixed attributes, or some subset of fixed attributes, in an export tenant data table can be restricted to be the same data size to optimize both search and system performance.

Similar to first tenant 250*a*, second tenant 250*b* has data that includes PII in payloads 1-Z 203*a*-203*z* to secure. Second tenant IHS 251*b* prepares records 205*a*-205*z* in export tenant data table "B" 206*b* to convey payloads 1-Z 203*a*-203*z*, with each payload associated with tabular labels 1-Y 209*a*-209*y*. Second tenant IHS 251*b* can hash tabular labels 1-Y 209*a*-209*y* using hashing algorithm "B" 210*b*, though another hashing algorithm, an encryption algorithm, another obfuscation method, or no obfuscation technique, can be used instead. Second tenant IHS 251*b* can encrypt payloads 1-Z 203*a*-203*z* using encryption algorithm "B" 212*b* and encryption key "B" 214*b*, though another encryption algorithm or key, a hashing algorithm, another obfuscation method, or no obfuscation technique, can be used instead.

Each of records 205*a*-205*z* also contain fixed attributes 226*a*-226*n* ("FA 1" through "FAN"). Each fixed attribute contains information which can facilitate the searching of records 205*a*-205*z* such as account numbers associated with individual customers or organizational identifiers associated with specific tenants, as well as, for example, first names, last names, last four digits of social security numbers, or other information. Each fixed attribute 226*a*-226*n* is hashed with hashing algorithm "B" 210*b* in the embodiment of FIG. 2A, though another hashing algorithm can be used, or the fixed attributes can be obfuscated in another way, or not obfuscated at all. Each column of fixed attributes, for example, each FA 1 226*a* in export tenant data table "B" 206*b*, will include the same type of data, for example, a hashed account number. Similarly, each FA N 226*n* will include the same type of data, for example, a hashed last name. The number of "N" fixed attributes in export tenant data table "B" 206*b* can vary depending on tenant needs, system performance requirements, and other variables, but can be preferred to be about five, though can be many more. The data size of all fixed attributes, or some subset of fixed attributes, in an export tenant data table can be restricted to be the same data size to optimize both search and system performance.

As seen in FIG. 2B-C, Epositbox API 216, which resides in controller 207, can export data from tenant data table "A" 206*a* of first tenant 250*a* to new data storage 244 of Blockchain System 260, as well as sidecar database 262, detailed below. Similarly, EpositBox API 216 can also export data from tenant data table "B" 206*b* of second tenant 250*b* to new data storage 244 of blockchain system 260, as well as sidecar 262, detailed below.

Records can include data indicating the tenant from which they originate. As shown in FIG. 2B, records received from first tenant 250*a* are assigned first tenant GUID 222*a*. Alternatively, for example, if records are sent without data indicating the tenant from which they originate, instead relying only, for instance, on the knowledge that records were received first tenant 250*a*, EpositBox API 216 can identify a first tenant GUID 222*a*, drawn from an encrypted tenant GUID data structure 218 that is encrypted with encryption key $K_{E0}$ 220, and assign first tenant GUID 222*a* to records received from first tenant 250*a*.

These tenant GUIDs serve as account identifiers for the records, indicating which tenant is associated with a record. First tenant GUIDs 222*a* can then be hashed with hashing algorithm "S" 227, though can be hashed with a different algorithm, can instead be encrypted, obfuscated in a different way, or not obfuscated at all. EpositBox API 216 appends the hashed first tenant GUID 222*a* to each record 204*a*'-204*x*' originating from first tenant IHS 251*a* to be stored on blockchain system 260, and can over-encrypt each payload 1-X 202*a*'-202*x*' with encryption algorithm "E" 224 using respective encryption keys $K_{E1}$-$K_{Ey}$ 222*a*-222*x*. Alternatively, encryption algorithm "E" 224 and encryption keys $K_{E1}$-$K_{Ey}$ 222*a*-222*x* can reside on blockchain system 260, in which case each payload 1-X 202*a*'-202*x*' is encrypted by blockchain system 260's smart contract 243 using encryption algorithm "E" 224 and encryption keys $K_{E1}$-$K_{Ey}$ 222*a*-222*x* as each payload 1-X is transferred to blockchain system 260. In yet another alternative, EpositBox API 216 can over-encrypt each payload 1-X 202*a*'-202*x*' with encryption algorithm "E" 224 and encryption keys $K_{E1}$-$K_{Ey}$ 222*a*-222*x*, and blockchain system 260 can further encrypt payload 1-X 202*a*'-202*x*' with an additional encryption algorithm "$E_{B1}$" (not shown) and encryption keys $K_{EB1}$-$K_{EBy}$ (not shown).

The use of hashed GUIDs obscure and make anonymous the source of data to a data thief. A GUID is a 128-bit unique reference number defined in RFC 4122 by the Internet Engineering Task Force (IETF). More complex unique reference identifiers (e.g. 256-bit, 512-bit, etc.), can also be used in some embodiments. GUIDs are used in computing as being highly unlikely to repeat when generated despite there being no central GUID authority to ensure uniqueness. GUIDs are also referred to as Universally Unique Identifiers (UUIDs) since there is no real difference between the two. A GUID follows a specific structure defined in RFC 4122 and can come in different versions and variants. All variants follow the same structure xxxxxxxx-xxxx-Mxxx-Nxxx-xxxxxxxxxxxx where M represents the version and the most significant bits of N represent the variant.

As noted above, because records can include data indicating the tenant from which they originate, EpositBox API 216 can assign second tenant GUID 222*b* to records received from second tenant 250*b*. Again, in the alternative, for example, if records are sent without data indicating the tenant from which they originate, relying instead only, for instance, on the knowledge that records were received from second tenant 250*b*, EpositBox API 216 can identify a second tenant GUID 222*b*, drawn from encrypted tenant GUID data structure 218 that is encrypted with encryption key $K_{E0}$ 220, and assign second tenant GUID 222*b* to records received from second tenant 250*b*

As discussed above, this tenant GUID serves as an account identifier for the records, indicating which tenant is associated with a record. Second tenant GUID 222*b* can then hashed with hashing algorithm "S" 227, though it can be hashed with a different algorithm, it can instead be encrypted, obfuscated in a different way, or not obfuscated at all. EpositBox API 216 appends hashed second tenant GUID 222*b* to each record 205*a*'-205*z*' and can over-encrypt each payload 1-Z 203*a*'-203*z*' with encryption algorithm "E" 224 using respective encryption keys $K_{F1}$-$K_{Fz}$223*a*-223*z*. Alternatively, encryption algorithm "E" 224 and encryption keys $K_{F1}$-$K_{F}z$ 223*a*-223*z* can reside with blockchain system 260 and smart contract 243—instead of EpositBox API 216—can perform over-encryption of payload 1-Z 203*a*'-203*z*'. Or, in yet another alternative, another encryption algorithm such as "$E_B$2" (not shown) and another set of encryption keys $K_{FB1}$-$K_{FBz}$ (not shown) can reside with blockchain system 260 such that smart contract 243 encrypts payload 1-Z 203*a*'-203*z*' in addition to encryption by EpositBox API 216.

As records 204*a*-204*x* and 205*a*-205*z* are exported to new data storage 244 and assigned tenant GUIDs 222*a* and 222*b*, each record is also assigned a block ID 271, a signature 272, and a JSON recovery object 273. Each block ID 271*a*-271*f* is randomly generated and uniquely identifies the location on blockchain system 260 of a record being created or updated. Each signature 272*a*-272*f* is a hash using hashing algorithm "C" 210*c* of a record's Block ID 271 and tabular labels, for example, 208*a*'-208*w*' or 209*a*'-209*y*'. Another hashing algorithm or obfuscation technique can be used in lieu of hashing algorithm "C" 201*c*, or no obfuscation can be used at all. Signature 272 is used to conduct integrity checks with sidecar database 262. Each record's JSON recovery object 273 contains a backup of the record and can be used to reconstitute sidecar 262 if sidecar 262 is corrupted or otherwise compromised. While JSON recovery object 273 is shown in this embodiment as utilizing a JSON file format, JSON Recovery Object 273 can be implemented using other file formats.

Block IDs 271*a*-271*f*, signatures 272*a*-272*f*, and tabular labels 208*a*'-208*w*' and 209*a*'-209*y*' for records 204*a*'-204*x*' and 205*a*'-205*z*' are copied to sidecar database 262 as corresponding records 204*a*"-204*x*" and 205*a*"-205*z*", with corresponding block IDs 271*a*'-271*f*', signatures 272*a*'-272*f*', and tabular labels 208*a*"-208*w*" and 209*a*"-209*y*". Fixed attributes 225*a*'-225*m*' and 226*a*'-226*n*' are also copied to sidecar database 262 as corresponding fixed attributes 225*a*"-225*m*" and 226*a*"-226*n*".

With records 204*a*"-204*x*" and 205*a*"-205*z*", sidecar database 262 streamlines queries to blockchain system 260. EpositBox IHS 264 receives queries for records by searching through fixed attributes. For example, in one scenario, fixed attribute FA 1 225*a*, FA 1 225*a*', and FA 1 225*a*" contain last names and are hashed with hashing algorithm A 210*a*. When EpositBox IHS 264 is queried for a last name, for example, "Smith," the query is similarly hashed with hashing algorithm A 201*a* and the hashed query is compared with the hashed entries of FA 1 225*a*" on the sidecar database 262. Depending on user selection, the hashed query can also be compared to some other subset of fixed attributes, or all fixed attributes, on the sidecar database 262. Optionally, if a broader search is requested or required, the hashed query can be compared with the hashed entries FA 1-FA M 225*a*"-225*m*". When the corresponding fixed attribute entries are identified, for example, the FA 1 225*a*" entries for records 204*a*" and 204*b*", the corresponding block ID is also identified, in this case, block ID 271*a*' and block ID 271*b*'. Blockchain system 260 is then queried to retrieve the payload corresponding to block IDs 271*a* and 271*b*, in this example, Payload 202*a*' and 202*b*'.

Sidecar database 262 is able to operate much more quickly than blockchain system 260, which can be distributed over many servers and locations. Therefore, the block ID for the payload or payloads being sought can be identified more quickly using sidecar database 262 as an intermediary rather than querying blockchain system 260 directly. Querying blockchain system 260 directly would require searching through all the FA 1 225*a*' entries which can be spread across distributed servers throughout the country or throughout the world, on which blockchain system 260 is instantiated.

Any further records from first tenant 250*a* and second tenant 250*b* will be appended to blockchain system 260 and sidecar database 262 on demand, without separating first tenant 250*a*'s records from those of second tenant 250*b* and allowing the records for different tenants to intersperse. With data from multiple tenants interspersed and with an anonymously hashed identifier on a distributed blockchain, any decrypted PII is difficult to associate with any particular person or particular tenant 250*a*-250*b*, shielding particular tenants 250*a*-250*b* from identification as well as liability. Hacker IHS 230 is presented with a difficult task to steal PII from EpositBox IHS 264. Moreover, the use of sidecar database 262 allows such security to be achieved with greater speed.

Furthermore, as discussed above, blockchains are immutable in that data cannot be deleted from a blockchain. Instead, to revise a previously entered record, a new version of the record is created on the blockchain while the previous version on the blockchain is updated to point to the new version, thus indicating the change without making any deletions. This versioning method can introduce delays in searching for a record which has been updated because the earliest version of a record must first be located; its metadata must be read, indicating the record has been updated and the location of the next most recent record identified; a sequence which repeats until the newest record has been located. Sidecar database 262 streamlines this process by storing the location of the latest version of each record.

Figure 2D:
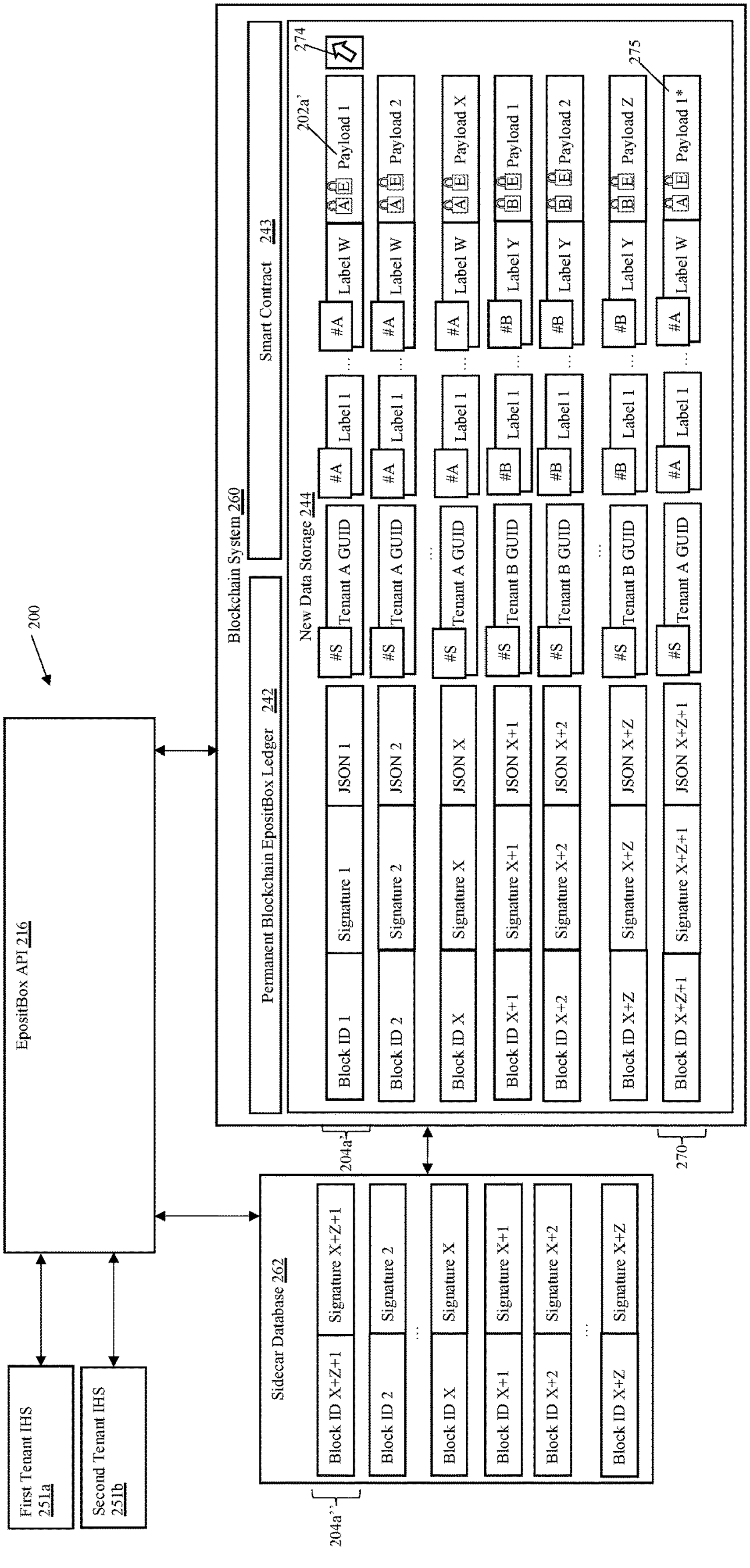

An update operation can be seen in FIG. 2D, which omits tabular labels and fixed attributes from sidecar database 262 for purposes of readability and conciseness. In FIG. 2D, record 204*a*'s payload 1 202*a*' has been updated to payload 1*275, now located in new record 270. This update could reflect, for example, a scenario where payload 1 202*a*' contained an old street address which is now updated to a new street address in payload 1*275. New record 270 is located at new block ID X+Z+1 and is associated with signature X+Z+1 which incorporates the new block ID in its hash. The associated JSON recovery object X+Z+1 is also updated. The tenant ID of record 270 remains unchanged, as does its tabular labels 1-W. Furthermore, old record 204*a*' now has an update entry 274 pointing to record 270 as the newer, updated version.

On sidecar database 262, record 204*a*" corresponds to record 204*a*' in blockchain system 260. Once record 204*a*' has been updated to record 270, located at block ID X+Z+1 in blockchain system 260, sidecar database 262 updates the block ID for record 204*a*" to point to the new block ID X+Z+1 location, and updates the signature for record 204*a*" to the new signature X+Z+1. Therefore, by using sidecar database 262 as an intermediary between EpositBox API 216 and blockchain system 260, queries to sidecar database 262 will point directly to the newest version of a record, located in the updated block ID for record 204*a*". This increases performance over the alternative of crawling systematically through each version of a record in blockchain system 260 starting at the oldest version until the newest record is located.

Figure 2E:
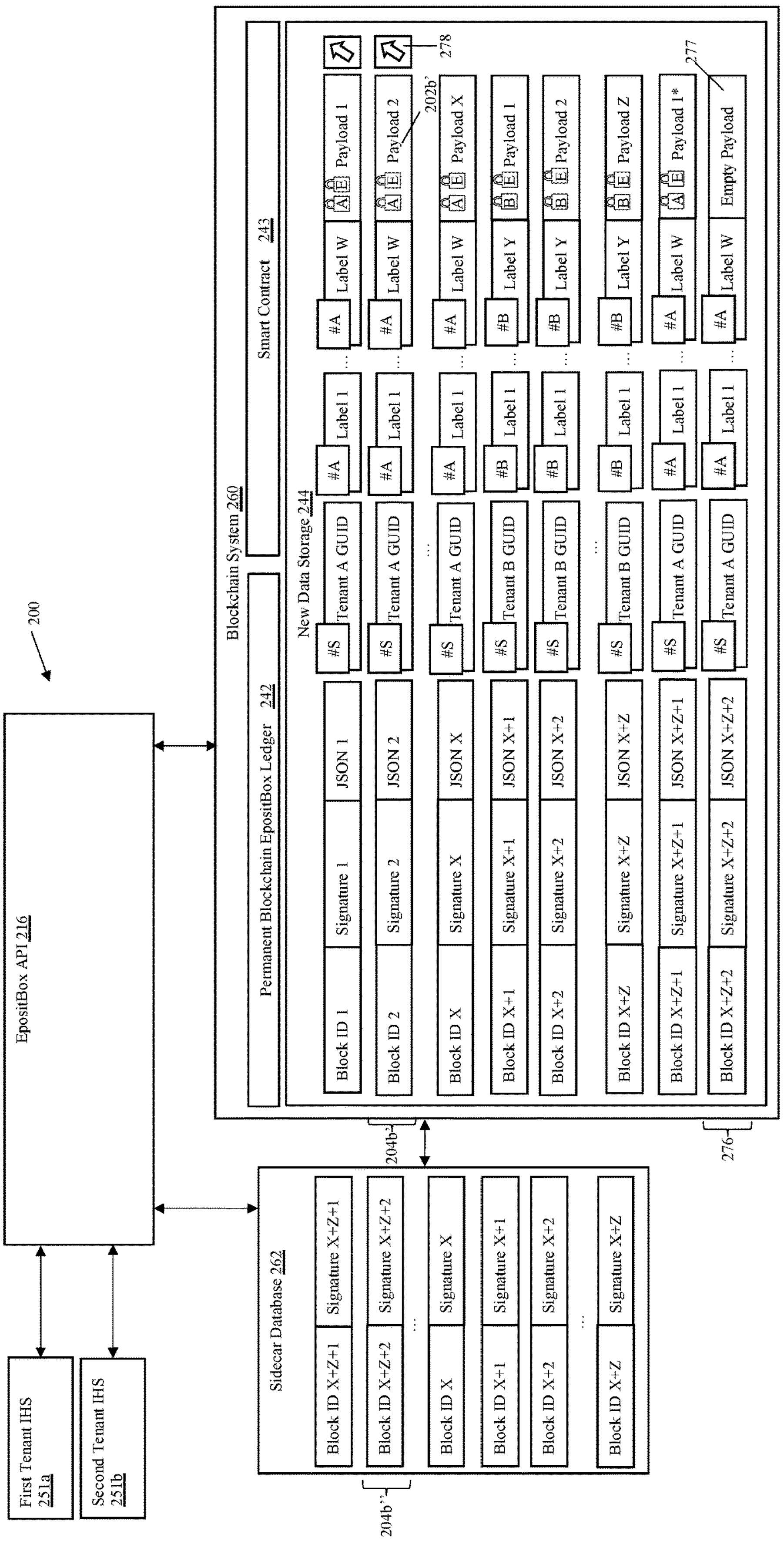

A delete operation can be seen in FIG. 2E, which omits fixed attributes and tabular labels in sidecar database 262 for readability and conciseness. In FIG. 2E, payload 2 202*b*' of record 204*b*' is to be deleted. This could reflect, for example, a customer deleting their account. A new record 276, located at new block ID X+Z+2 is created with an empty payload 277. The signature and JSON object for record 276 can be updated to reflect the new block ID, while other entries such as the labels and fixed attributes can be left unchanged or deleted. Update entry 278 is added to record 204*b*' pointing to record 276 as the newer, updated version of old record 204*b*'.

On sidecar database 262, record 204*b*" corresponds to record 204*b*' in blockchain system 260. With record 204*b*' updated to record 276, located at Block ID X+Z+2 in blockchain system 260, sidecar database 262 also updates record 204*b*" to point to the new block ID X+Z+2 location on blockchain system 260 as well, and also updates the signature for record 204*a*" to accordingly. Therefore, as with the updating function, by using sidecar database 262 as an intermediary between EpositBox API 216 and Blockchain System 260, queries to sidecar database 262 will point directly to the newest version of record 204*b*', located at Block X+Z+2, rather than iteratively crawling through older versions of a record until the newest record is found.

Figure 3A:
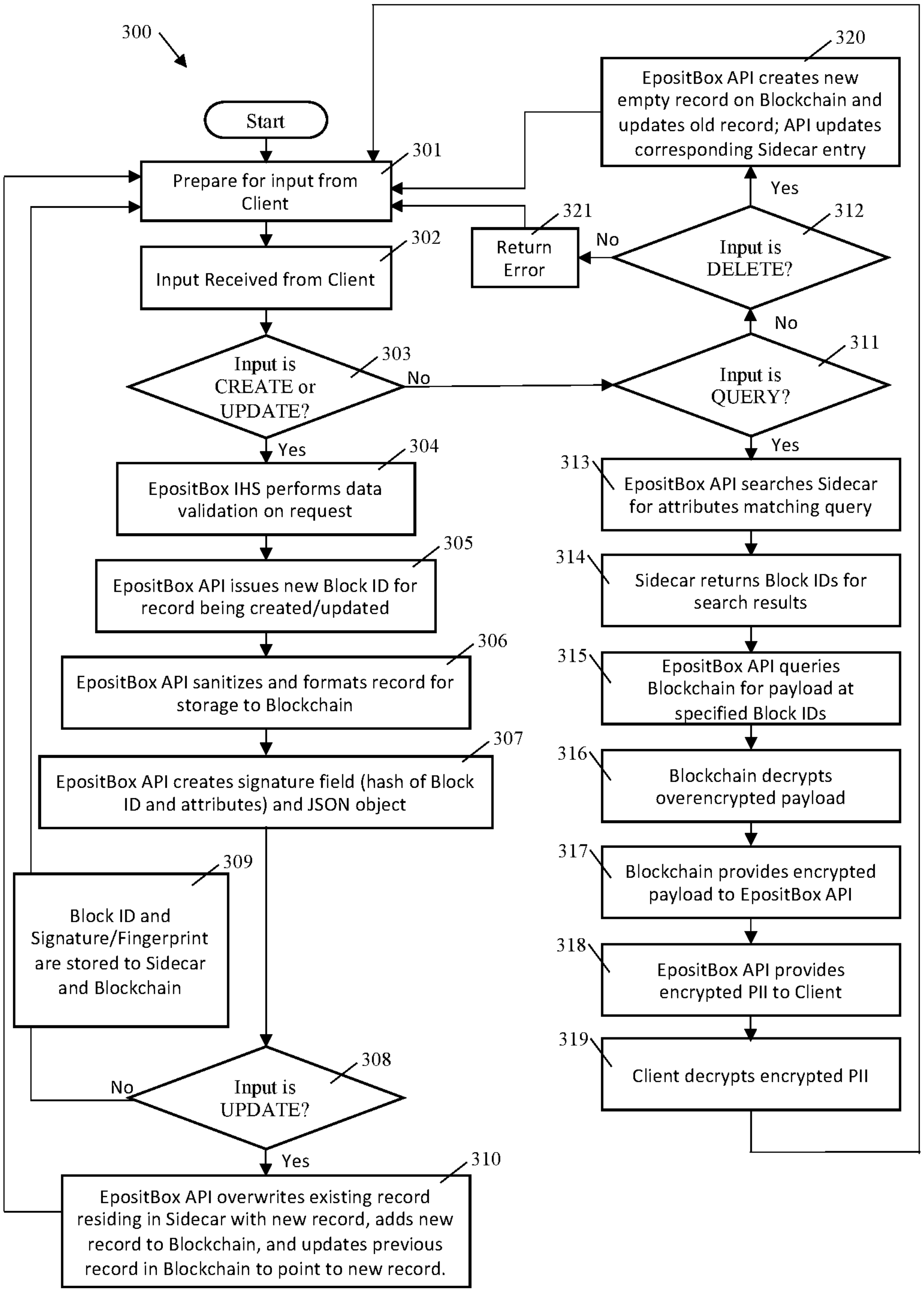
FIG. 3A-B presents a flow diagram of a method for securely storing personally identifiable information (PII) in an electronic deposit box.
Figure 3B:
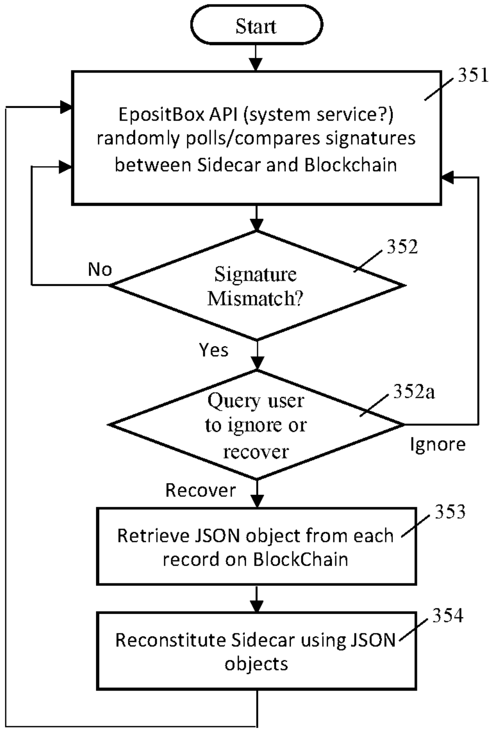

FIGS. 3A-B presents a flow diagram of method 300 for securely managing PII in an electronic deposit box. EpositBox IHS 264 can perform the functionality of method 300. Components described below for method 300 can be performed by like named components described above for FIGS. 1-2. Method 300 can include block 301 of preparing for input from client. This can include securely connecting between EpositBox IHS 264 and a tenant, such as tenant IHS 251*a* or 251*b*, via a network 128. This step can include exchanging credentials between EpositBox IHS 264 and tenant IHS 251*a*, such as user names, passwords, internet protocol (IP) addresses, as well as other credentials, and verifying those credentials. This step can also include awaiting input from the client.

Block 302 includes EpositBox IHS 264 receiving an input from the client. This input can include a tenant data structure comprising at least one tenant record which can constitute a new record or records, such as export data table A 206*a* or export data table B 206*b*, a record update, a record query, record deletion, or some other form of input, as well as additional information which will be discussed below.

Decision block 303 depends on whether the input is to create or update a record. If the input is a request to create a new record or update an existing record, the flow diagram proceeds to block 304. If the input is not a new record or record update, the flow diagram moves to decision block 311.

In block 304, EpositBox API 216 performs data validation and sanitation on the request. The input received from the client will be verified for necessary components, such as tabular labels, payloads, fixed attributes, and/or data integrity checks. The flow diagram then moves to block 305.

In block 305, EpositBox API 216 issues a new block ID for the record being created or updated. Tenant GUIDs, such as tenant IDs 222*a* or 222*b*, can also be assigned to the record being modified, and the data flow continues to block 306.

In optional block 306, should blockchain system 260 use different data storage requirements from EpositBox IHS 164, EpositBox API 326 performs data sanitation and validation on the record in preparation for storage in blockchain system 260.

Next, in block 307, EpositBox API 326 creates a signature field for the new record, such as signature 272*a*, by hashing the record's block ID and tabular labels, such as block ID 271*a* and tabular labels 208*a*'-208*w*'. This signature field can later be used as verification to test whether sidecar database 164 has been corrupted, tampered with, inadvertently modified, or otherwise compromised. EpositBox API 326 also creates a JSON object, such as any of JSON objects 273, which contains a backup copy of the record and can be used to restore sidecar 262 should it become corrupted or otherwise compromised.

In decision block 308, if the input is not an update, then the flow proceeds to block 309, in which the signature (e.g. signature 272*d*), payload (e.g. payload 203*a*'), tenant ID (e.g. tenant ID 222*b*), fixed attributes (e.g. fixed attributes 226*a*'-226*n*'), and tabular labels (e.g. tabular labels 209*a*'-209y') are stored in blockchain system 120 at the assigned block ID, while the block ID (e.g. block ID 271*a*'), signature (e.g. signature 272*a*'), fixed attributes (e.g. fixed attributes 225*a*"-225*m*"), and tabular labels (e.g. labels 208*a*"-208*w*") are stored to sidecar 164. This data, including the payload, can be hashed, encrypted, overencrypted, or otherwise obfuscated by the blockchain system 120 or by the EpositBox API at an earlier step. The flow then returns to block 301.

If the input is an update in decision block 308, then EpositBox API 216 adds the updated record to blockchain system 120 at the assigned block ID, adding an update entry, such as update entry 274, in the now obsolete record as a pointer to the updated record and, on sidecar 164, the existing, older record is overwritten with the new record. The flow then returns back to block 301.

If decision block 303 determines the input is neither a create or update request, the flow proceeds to decision block 311 which determines whether the input is a query. If so, the flow directs to block 313. If not, the flow directs to decision block 312, which determines if the input is a delete operation.

At block 313, the query has provided at least one fixed attribute to search. EpositBox API 216 searches sidecar 262 for attributes matching the query and identifies the relevant block IDs. In the next block, block 314, sidecar 262 returns the relevant block IDS to EpositBox API 162.

In block 315, Epositbox API 216 queries the blockchain system 260 for the payloads found at the relevant block IDS.

At block 316, if blockchain system 260 has encrypted or overencrypted the payloads, blockchain system 260 decrypts the payloads. If EpositBox API 216 has encrypted or decrypted the payloads, EpositBox API 216 decrypts the payloads.

In block 317, blockchain system 260 forwards the payloads to Epositbox API 216. In turn, in block 318, EpositBox API 216 provides the payloads to the client.

If the payloads are still encrypted or otherwise obfuscated, in block 319, the client then decrypts the encrypted payloads into decrypted form. The flow then returns back to block 301.

If the input is determined to not be a query operation in decision block 311, the flow directs to decision block 312 which determines if the input is a delete operation. If the input is not a delete operation, the flow proceeds to block 321 where an error message is returned and the flow proceeds back to block 301. If the input is a delete operation, the flow proceeds to block 320. If the input is a delete request, the flow proceeds to block 320. At block 320, a new record at a new block ID is created on blockchain system 260 with a payload that is void, null, blank, or otherwise empty, such as payload 277, and an update entry, such as entry 278, is appended to the old record pointing to this newer, updated version of the record. The record in sidecar 262 corresponding to the old record is also updated to point to the newer, updated version of the record with the empty payload. The flow then returns to block 301.

FIG. 3B illustrates a flowchart describing recovery of the sidecar.

In block 351, Epositbox API 216 randomly polls the sidecar, such as sidecar indexing database 262, at random intervals and compares a record's signature, such as signature 272*b*' of record 204*b*", with the signature of the corresponding record in the blockchain, such as blockchain system 260, such as signature 272*b* of record 204*b*'.

Alternatively, in block 351, EpositBox API 216 can poll the sidecar, such as sidecar 262, at random intervals. As discussed above, a signature is a hash using a record's block ID and tabular labels. So, instead of comparing, for example, signature 272*b*' of record 204*b*" against the signature in blockchain system 260, signature 272*b*, EpositBox API 216 can instead compare signature 272*b* against a dynamically generated check signature created from the sidecar's copy of a record's block ID—in this example, the block ID associated with record 204*b*'- and from the sidecar's copy of the record's tabular labels, here labels 208*a*'-208*w*' using the relevant hashing algorithm, in this case, hashing algorithm C 210*c*. The flow then proceeds as before, into decision block 352, to determine whether there is a mismatch between the blockchain's signature and the generated check signature.

At decision block 352, EpositBox API 162 determines whether there is a mismatch between the sidecar's signature and blockchain's signature. If there is no mismatch, the flow returns to block 351. If there is a mismatch, the flow can proceed to optional decision block 352*a* which queries for user input to either ignore the mismatch, in which case the flow will return to block 351, or to recover the sidecar, in which case the flow proceeds to block 353. In the absence of optional decision block 352*a*, the flow will simply proceed to block 353 if a mismatch is found in decision block 352.

At block 353, EpositBox API 216 retrieves the JSON object, such as any of JSON objects 273, for each record in the blockchain.

The flow then proceeds to block 354, where EpositBox API 216 recreates the sidecar using the retrieved JSON objects. The flow then returns to block 351.

It will be apparent to those skilled in the art that various modifications and variations can be made to the disclosed system. Other examples will be apparent to those skilled in the art from consideration of the specification and practice of the disclosed system. By way of non-limiting examples, data discussed in this specification can be hashed, encrypted, overencrypted, otherwise obfuscated, or not obfuscated at all. It is intended that the specification and examples be considered as illustrative only, with a true scope being indicated by the following claims and their equivalents.

What is claimed is:

1. An information deposit environment comprising:
a blockchain system;
a sidecar database configured as an indexing database;
one or more tenant information handling systems (IHS); and
a depositary IHS comprising:
a network interface communicatively connectable, via a network, to one or more tenant IHS, the blockchain system, and the sidecar database;
a secure memory that stores an electronic deposit box application; and
a controller communicatively coupled to the network interface and the secure memory and comprising at least one hardware processor that executes the electronic deposit box application to configure the depositary IHS, and which:
connects, via the network interface, with the tenant IHS;
receives, from the tenant IHS, a tenant data structure comprising at least one tenant record, each tenant record including a data payload and one or more tenant-hashed tabular labels associated with the data payload, wherein the data payload has been encrypted by the tenant IHS using a first encryption algorithm and a first encryption key;
further encrypts the payload using a second encryption algorithm and a second encryption key;
assigns a block ID to the tenant record;
creates a signature comprising a hash of the block ID and the one or more tabular labels;
appends a tenant identifier associated with the tenant, and the signature, to the at least one tenant record of the tenant data structure;
stores the at least one tenant record in a blockchain system; and
stores the block ID and the signature to the sidecar database, and wherein the data payload is not stored to the sidecar database.

2. The information deposit environment of claim 1, wherein the depositary IHS further comprises the sidecar database.

3. The information deposit environment of claim 1, wherein the blockchain system is a private blockchain.

4. The information deposit environment of claim 1, wherein the blockchain system is a public blockchain.

5. The information deposit environment of claim 1, wherein the blockchain system comprises a multiple-tenant data store.

6. The information deposit environment of claim 1, wherein the depositary IHS further appends a JSON recovery object to the at least one tenant record of the tenant data structure.

7. The information deposit environment of claim 6, wherein the controller compares the signature stored in the blockchain system with the signature stored in the sidecar database; and reconstitutes the sidecar database from the JSON recovery object if the signatures do not match.

8. The information deposit environment of claim 1, wherein the controller stores the tabular labels to the sidecar indexing database.

9. The information deposit environment of claim 1, wherein the first encryption key is stored on the tenant IHS, and the second encryption key is stored on the depository IHS secure memory.

10. The information deposit environment of claim 1, wherein the first encryption key is not stored on the depository IHS secure memory.

11. The information deposit environment of claim 1, wherein the block ID identifies the location of the at least one tenant record on the blockchain system.

12. The information deposit environment of claim 1, wherein, in response to an input to update the data payload, the controller:

assigns a new block ID to the at least one tenant record;

creates a new signature comprising a hash of the new block ID and the one or more tabular labels;

update the signature in the at least one tenant record with the new signature;

stores the updated at least one tenant record in the blockchain system; and stores the new block ID and the new signature to the sidecar database.

13. A method comprising:

securely connecting, via a network interface of a depositary information handling system (IHS), with a tenant IHS, the depositary IHS comprising the network interface communicatively connectable, via a network, to one or more tenant IHS, a blockchain system, and a sidecar indexing database; a secure memory; and a controller communicatively coupled to the network interface and the secure memory and comprising at least one hardware processor, and;

receiving, from the tenant IHS, a tenant data structure comprising at least one tenant record, each tenant record including a data payload one or more tenant-hashed tabular labels associated with the data payload, wherein the payload has been encrypted by the tenant IHS using a first encryption algorithm and a first encryption key;

further encrypting the data payload using a second encryption algorithm and a second encryption key;

assigning a block ID to the tenant record;

creating a signature comprising a hash of the block ID and the one or more tabular labels;

appending a tenant identifier associated with the tenant, and the signature, to the at least one tenant record of the tenant data structure;

storing the at least one tenant record in the blockchain system; and storing the block ID and the signature to the sidecar indexing database, and wherein the data payload is not stored to the sidecar indexing database.

14. The method of claim 13, further comprising:

querying the depositary IHS for the tenant record;

retrieving the block ID for the tenant record from the sidecar indexing database;

retrieving the payload stored at the block ID in the blockchain system; and decrypting the payload using the second encryption key.

15. A computer program product comprising:

a computer readable storage device; and program code on the computer readable storage device that when executed by a processor associated with a depositary information handling system (IHS), the depositary IHS comprising a network interface communicatively connectable, via a network, to one or more tenant IHS, a blockchain system, and a sidecar indexing database; a secure memory; and a controller communicatively coupled to the network interface and the secure memory and comprising at least one processor, and the program code enables the depositary IHS to provide functionality of:

securely connecting, via the network interface of the depositary IHS, with the tenant IHS;

receiving, from the tenant IHS, a tenant data structure comprising at least one tenant record, each tenant record including a data payload and one or more tenant-hashed tabular labels associated with the data payload; wherein the payload has been encrypted by the tenant IHS using a first encryption algorithm and a first encryption key;

further encrypting the data payload using a second encryption algorithm and a second encryption key;

assigning a block ID to the tenant record;

creating a signature comprising a hash of the block ID and the one or more tabular labels;

appending a tenant identifier associated with the tenant, and the signature, to the at least one tenant record of the tenant data structure;

storing the at least one tenant record in the block chain system; and storing the block ID and the signature to the sidecar indexing database, and wherein the data payload is not stored to the sidecar indexing database.

* * * * *